O. C. KAVLE.
SPINDLE HOLDER.
APPLICATION FILED JAN. 22, 1920.
1,361,160.
Patented Dec. 7, 1920.
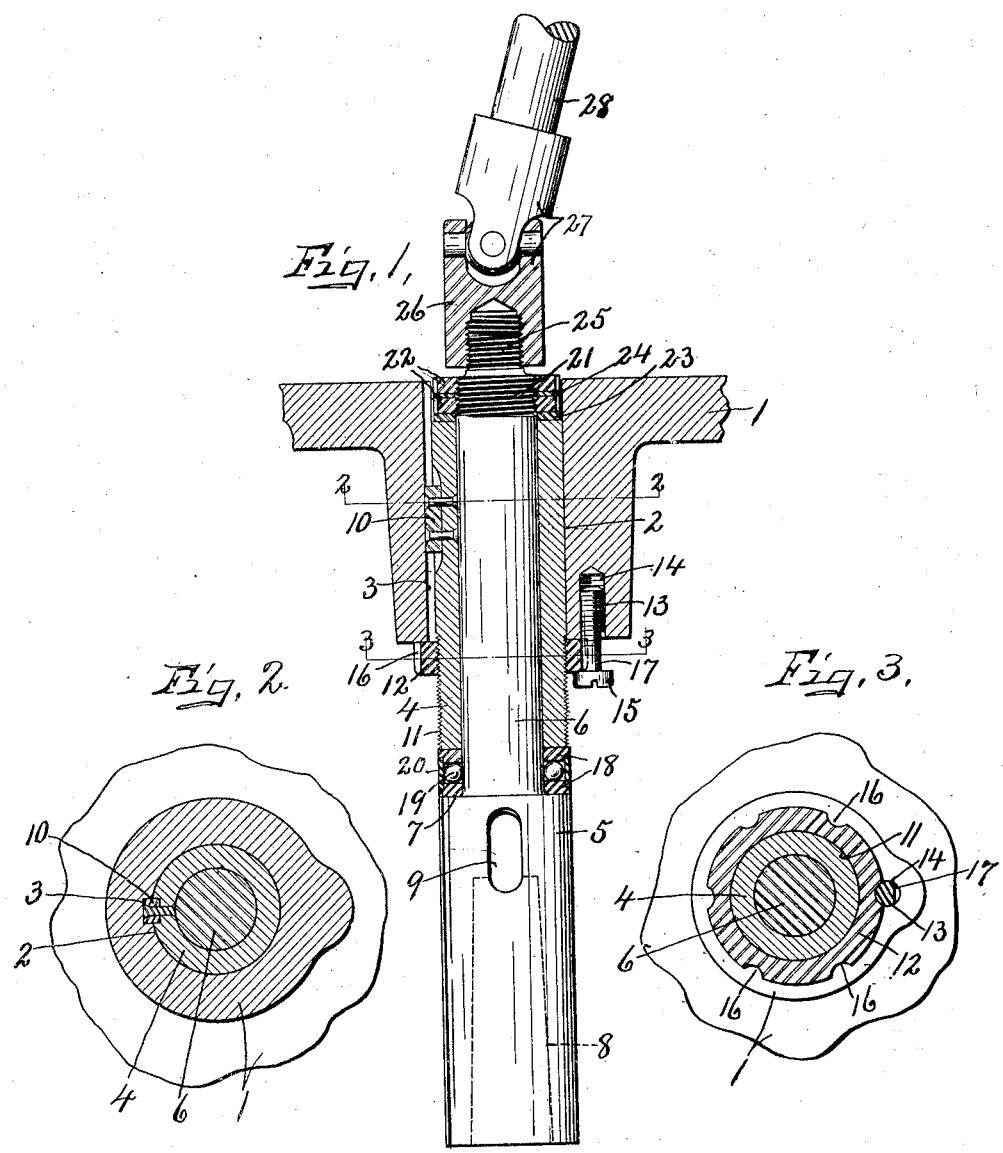

UNITED STATES PATENT OFFICE.

OSCAR C. KAVLE, OF SYRACUSE, NEW YORK.

SPINDLE-HOLDER.

1,361,160.　　　　　Specification of Letters Patent.　　Patented Dec. 7, 1920.

Application filed January 22, 1920. Serial No. 353,162.

*To all whom it may concern:*

Be it known that I, OSCAR C. KAVLE, of Syracuse, in the county of Onondaga, in the State of New York, have invented new and useful Improvements in Spindle-Holders, of which the following, taken in connection with the accompanying drawings, is a full, clear, and exact description.

This invention relates to certain improvements in spindle holders for gang drills and analogous machines employing a plurality of rotary tool holders mounted upon what is commonly known as a cluster plate. In many of the labor saving machines now in common use where a considerable number of similar operations, such as drilling, counterboring, reaming or other milling, are to be performed upon the same object, it is customary to provide a cluster plate with means for receiving and supporting a corresponding number of similar cutting tools arranged in such manner as to perform their individual operations simultaneously either by the movement of the tool support toward the work or the work support toward the tool.

The relative position of these tools upon the cluster plate differs materially for different classes of work and it frequently happens that the work performed upon one object is substantially the same as that performed on another object although in different positions, which would enable the same tools used in one cluster plate to be used in another cluster plate but in different relative positions and the primary object of my invention is to support the tool carrying spindles in such manner that they may be easily and quickly removed from one cluster plate and placed in another cluster plate without removing the tool from the spindle, and at the same time providing for the axial adjustment of the individual spindles independently of each other relatively to the cluster plate so that the operation of all of the tools on either of the cluster plates upon the work may be simultaneous.

Other objects and uses relating to the means of attachment of the tool carrying spindles to the cluster plate and to the driving means for the spindle will be brought out in the following description.

In the drawings:

Figure 1 is a vertical sectional view of a portion of a cluster plate and one of the removable supports for the tool carrying spindle mounted therein, the rotary spindle being shown in elevation as connected to a portion of a flexible driving shaft.

Figs. 2 and 3 are transverse sectional views taken respectively on lines 2—2 and 3—3, Fig. 1.

In order that my invention may be clearly understood I have shown a portion of a cluster plate —1— having one or more vertical openings —2— and a lengthwise keyway or channel —3— in one side of the opening which latter is adapted to receive a vertically adjustable sleeve —4— for receiving and supporting a rotary tool carrying spindle —5—.

This spindle is provided at one end with a reduced shank —6— journaled in and extending entirely through the central lengthwise opening of the sleeve —4—, the other end being enlarged to form an annular shoulder —7— and is provided with a tapered socket —8— for receiving a correspondingly tapered portion of a drill or other tool, not shown, the socket —8— being shown by dotted lines in Fig. 1.

The enlarged portion of the spindle —5— is provided with a transverse vertical elongated opening —9— extending a short distance below the upper end of the socket —8— for receiving the usual drift key, not shown, but which may be employed for driving the tapered portion of the tool out of the socket —8—.

The sleeve —4— extends from the underside upwardly into the opening —2— and is provided with a key —10— entering the keyway —3— to hold the sleeve against turning relative to the plate —1— but permitting it to move endwise in the opening —2—, the lower end of said sleeve being threaded at —11— and is engaged by a nut —12—.

This nut engages the underside of the hub of the plate —1— in which the opening —2— is formed and serves to hold the sleeve against upward movement when properly adjusted.

A machine screw —13— opening from the underside of the hub of the plate —1— is engaged in a threaded socket —14— lengthwise of the axis of the sleeve —4— and is provided with a head —15— engaging the underside of the nut —12— to hold the sleeve against downward movement when adjusted for use.

In order that the nut —12— may be held in its adjusted position on the sleeve —4— it is provided with a series of peripheral notches —16— arranged in uniformly spaced relation circumferentially as shown more clearly in Fig. 3 to receive the portion of the screw —13— between the lower faces of the hub of the plate —1— and head —15— of the screw, which when in one position forms a key for locking the nut against turning. One side of the shank of the screw —15— is however flattened at —17— and this flattened portion may be caused to face the adjacent side of the nut by simply turning the screw, in this instance, a half turn for adjusting the sleeve and tool supporting spindle axially to bring the cutting edge of the tool into proper relation to the work while the head —15— of the screw serves to hold the nut against downward displacement during the adjustment of the sleeve.

It will be noted that the nut —12— and screw —15— are in close proximity to each other and are both arranged at the underside of the plate —1— where they are conveniently accessible for adjustment and that the sleeve with the nut and tool supporting spindle thereon may be easily and quickly removed from the plate —1— by simply removing the screw —15— and detaching the driving element (presently described) from the upper end of the tool carrying spindle and thus permitting the same sleeve with the tool carrying spindle and tool thereon to be used as a unit in another cluster plate without separating the sections of that unit one from the other, it being understood that the openings as —2— in the different cluster plates will be substantially identical although in different relative positions.

A pair of hardened bearing washers or disks —18— are interposed between the annular shoulder —7— of the tool supporting spindle —5— and adjacent end face of the sleeve —4— in spaced relation to each other for receiving between them anti-friction balls —19— and a retainer ring —20—, as shown more clearly in Fig. 1, to constitute an anti-friction end thrust bearing between the spindle —5— and the sleeve —4—. The upper end of the shank —6— of the spindle —5— is threaded at —21— for receiving coaxial nuts —22— which serve to hold the spindle sleeve against relative endwise movement in one direction.

A hardened washer or disk —23— is interposed between the innermost nut —22— and adjacent end face of the sleeve —4— to form an end thrust bearing for said sleeve, a lock washer —24— being interposed between the nuts —22— to hold them against relative movement when tightened.

The extreme upper end of the shank —6— of the spindle —5— is reduced and threaded at —25— and is engaged by an internally threaded section —26— of a universal joint —27— which constitutes a part of a flexible driving shaft —28— for rotating the spindle —5—. The driving shaft —28— may be connected to any available source of power, not necessary to herein illustrate or describe, the universal joint —27— serving to permit the tool carrying spindle and its supporting sleeve to be used in different positions relative to the driving element, that is coaxial therewith or at different angles thereto according to the relative positions of the openings —2— in the different cluster plates —1—.

Although I have shown a single driving spindle —5— and its supporting sleeve —4— together with the adjusting nut —12—, it is to be understood that any number of these parts may be used on different cluster plates having openings —2— in different relations to each other for receiving the sleeves and that the driving elements as —28— may be operated simultaneously by any suitable gear train for causing a simultaneous rotation of their respective spindles —5— and tools carried thereby. As shown in Fig. 1, the screw —15— is adjusted to lock the nut —12— against turning and also to hold said nut together with the sleeve —4— and spindle —5— against downward displacement but, if it should be desired to adjust the sleeve and spindle carried thereby axially, it is simply necessary to turn the screw —15— sufficiently to register its flattened face —17— with the adjacent side of the nut whereupon the nut may be turned to effect the desired adjustment of the sleeve after which the screw may be returned to its normal position to lock the nut against further turning movement.

On the other hand if it is desired to use the spindle with the tool therein in another cluster plate in which the openings —2— are differently arranged, it is simply necessary to uncouple the driving element from the upper end of the spindle —5— and then to remove the screw —15— which permits the sleeve —4— with the nut —12— and spindle —5— thereon together with the end thrust bearings and key —10— to be withdrawn downwardly out of the opening —2— and reinsert in a similar opening in the other plate thereby keeping the tool and its supporting spindle together with the sleeve and the other parts previously named in the same relative positions all of which not only greatly reduces the number of parts necessary to similar operations upon different objects but also expedites the work of properly placing the cutting tools and their supporting elements in correct relative positions in different cluster plates.

What I claim is:—

1. In a gang drilling or analogous machine the combination of a cluster plate having an opening and keyway along one side of the opening, a sleeve movable endwise in said opening and provided with a key entering said keyway to hold the sleeve against relative rotary movement on the plate, said sleeve having a threaded portion, a nut engaged with the threaded portion of the sleeve and plate for adjusting the sleeve axially, a screw engaged in a threaded socket in the plate and provided with a head for engaging the nut to hold the latter against axial movement away from the plate, a tool carrying spindle rotatably mounted in the sleeve, devices for holding the spindle and sleeve against relative endwise movement and means for rotating the spindle.

2. The combination of a horizontally disposed plate having a vertical opening therethrough, a sleeve adjustable axially in said opening, means for holding the sleeve against rotary movement relative to the plate, a nut engaging the sleeve and plate for adjusting the sleeve axially and holding it against upward displacement, means on the plate for engaging the nut and holding it against downward displacement, a tool carrying spindle journaled in the sleeve, means for holding the sleeve and spindle against relative axial movement and means for rotating the spindle.

3. In a machine of the character described the combination of a plate having an opening therethrough, a threaded sleeve adjustable endwise in said opening, means for holding the plate and sleeve against relative rotation, a nut engaged with the plate and threaded sleeve for adjusting the latter endwise, movable means on the plate for locking the nut in its adjusted position and for holding said nut against axial movement in one direction, a rotary tool carrying spindle journaled in the sleeve, means for holding the spindle and sleeve against relative axial movement and means for rotating the spindle.

4. In a machine of the character described the combination of a plate having a vertical opening therethrough, a threaded sleeve slidable endwise in said opening, a nut engaging the threaded portion of the sleeve and underside of the plate for adjusting said sleeve endwise and holding it in its adjusted position against upward movement and movable means on the plate for locking and releasing the nut in and from its adjusted position and for holding said nut and sleeve against downward displacement when adjusted for use, a tool carrying spindle journaled in the sleeve, means for holding the sleeve and spindle against relative endwise movement when the nut is locked and means for rotating the spindle.

In witness whereof I have hereunto set my hand this 15th day of January, 1920

OSCAR C. KAVLE.

Witnesses:
  H. E. CHASE,
  E. T. BURNS.